(12) United States Patent
Liu et al.

(10) Patent No.: US 12,166,591 B2
(45) Date of Patent: Dec. 10, 2024

(54) METHOD AND DEVICE FOR FACILITATING HARQ TRANSMISSION

(71) Applicant: Telefonaktiebolaget LM Ericsson (PUBL), Stockholm (SE)

(72) Inventors: Jinhua Liu, Beijing (CN); Gen Li, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 849 days.

(21) Appl. No.: 17/266,412

(22) PCT Filed: Jul. 22, 2019

(86) PCT No.: PCT/CN2019/097086
§ 371 (c)(1),
(2) Date: Feb. 5, 2021

(87) PCT Pub. No.: WO2020/029787
PCT Pub. Date: Feb. 13, 2020

(65) Prior Publication Data
US 2021/0297195 A1    Sep. 23, 2021

(51) Int. Cl.
*H04L 1/18* (2023.01)
*H04L 1/1812* (2023.01)
(Continued)

(52) U.S. Cl.
CPC .......... *H04L 1/1887* (2013.01); *H04L 1/1812* (2013.01); *H04W 72/1268* (2013.01); *H04W 72/23* (2023.01)

(58) Field of Classification Search
CPC ......... H04W 52/0254; H04W 52/0216; H04W 52/0219; H04W 4/70; H04W 4/08;
(Continued)

(56) References Cited

U.S. PATENT DOCUMENTS

| 8,553,648 B2 * | 10/2013 | Lee | H04L 5/0098 455/438 |
| 9,002,392 B2 * | 4/2015 | Lee | H04L 5/0007 455/450 |

(Continued)

FOREIGN PATENT DOCUMENTS

| CN | 101155013 A | 4/2008 |
| CN | 101702812 A | 5/2010 |

(Continued)

OTHER PUBLICATIONS

PCT Notification of Transmittal of the International Search Report and the Written Opinion of the International Searching Authority, or the Declaration issued by International application No. PCT/CN2019/097086—Oct. 22, 2019.
(Continued)

*Primary Examiner* — Jung Liu
(74) *Attorney, Agent, or Firm* — Baker Botts L.L.P.

(57) ABSTRACT

The present disclosure provides a method (100) in a terminal device for facilitating Hybrid Automatic Repeat reQuest (HARQ) transmission. The method (100) includes: starting (110), upon transmitting data to a network device in a first HARQ transmission using a first HARQ process, a first configured grant timer associated with first the HARQ process; receiving (120) from the network device HARQ feedback information associated with the first HARQ transmission; and applying (130) a timer operation to the first configured grant timer based on the HARQ feedback information.

15 Claims, 8 Drawing Sheets

(51) Int. Cl.
*H04L 1/1867* (2023.01)
*H04W 72/1268* (2023.01)
*H04W 72/23* (2023.01)

(58) Field of Classification Search
CPC ...... H04W 4/06; H04W 8/186; H04L 12/189; H04L 12/1868; H04L 61/5069; H04L 61/5076; Y02D 30/70
See application file for complete search history.

(56) References Cited

U.S. PATENT DOCUMENTS

| 9,288,012 | B2 | 3/2016 | Chen et al. | |
| 10,477,522 | B2* | 11/2019 | Marinier | H04W 72/20 |
| 10,491,358 | B2* | 11/2019 | Son | H04W 48/12 |
| 10,582,530 | B2* | 3/2020 | Zou | H04L 1/1822 |
| 11,082,164 | B2* | 8/2021 | You | H04W 74/0808 |
| 2012/0201151 | A1 | 8/2012 | Kubota | H04L 1/1851 370/252 |
| 2013/0308507 | A1 | 11/2013 | Wänstedt et al. | |
| 2014/0226557 | A1* | 8/2014 | Lee | H04W 52/0254 370/312 |
| 2018/0159668 | A1 | 6/2018 | Phuyal et al. | |
| 2019/0149308 | A1* | 5/2019 | Son | H04L 5/0007 375/260 |
| 2019/0150180 | A1* | 5/2019 | Zou | H04L 1/1822 370/329 |
| 2020/0328848 | A1* | 10/2020 | He | H04L 1/1854 |

FOREIGN PATENT DOCUMENTS

| CN | 107949998 A | 4/2018 |
| WO | 2018060972 A1 | 4/2018 |
| WO | 2018 107944 A1 | 6/2018 |
| WO | 2018 123950 A1 | 7/2018 |
| WO | 2020 033395 A1 | 2/2020 |

OTHER PUBLICATIONS

3GPP TSG RAN WG2 Meeting 100; Reno, United States; Source: Huawei; Title: Summary of [99bis#41] [NR UP/ MAC] Open issues on SPS and GF-Huawei (R2-1713173)—Nov. 27-Dec. 1, 2017.
3GPP TSG-RAN WG2 Meeting #101; Athens, Greece; Source: ASUSTek; Title: Remaining issues on configured grant timer (R2-1801891)—Feb. 26-Mar. 2, 2018.
EPO Communication Pursuant To Rule 164(1) EPC issued for Application No./Patent No. 19847691.3-1205 PCT/CN2019097086—Aug. 23, 2021.
3GPP TSG-RAN WG2 Ad Hoc; Vancouver, Canada; Source: Huawei, HiSilicon; Title: Impacts of new RNTIs on DRX (R2-1800637)—Jan. 22-26, 2018.
3GPP TSG-RAN WG2 Meeting #AH-1807; Montreal, Canada; Source: Huawei, HiSilicon; Title: Transmission without grant for NR-U (R2-1810576)—Jul. 2-6, 2018.
Notice of Reasons for Rejection issued for Japanese Patent Application No. 2021-505695—Mar. 17, 2022.
3GPP TSG RAN WG1 Meeting #94; Gothenburg, Sweden; Source: Institute for Information Industry (III); Title: Discussion on Configured Grant Enhancements (R1-1809294)—Aug. 20-24, 2018.
Examination Report Under Sections 12 &13 of Patents Act, 1970 and the Patents Rules, 2003 issued by Intellectual Property India for Application No. 202147008870—Jan. 21, 2022.
First Office Action Notification issued for Chinese Application No. 201980052025—Sep. 6, 2023.
China Patent Office, Official Action in CN Application No. 201980052025.7, dated Mar. 28, 2024 (machine translated).

* cited by examiner

METHOD AND DEVICE FOR FACILITATING HARQ TRANSMISSION

PRIORITY

This nonprovisional application is a U.S. National Stage Filing under 35 U.S.C. § 371 of International Patent Application Serial No. PCT/CN2019/097086 filed Jul. 22, 2019 and entitled "METHOD AND DEVICE FOR FACILITATING HARQ TRANSMISSION" which claims priority to International Patent Application Serial No. PCT/CN2018/099203 filed on Aug. 7, 2018 both of which are hereby incorporated by reference in their entirety.

TECHNICAL FIELD

The present disclosure relates to wireless communication, and more particularly, to methods and devices for facilitating Hybrid Automatic Repeat reQuest (HARQ) transmission.

BACKGROUND

In New Radio (NR), there are two types of scheduling schemes for uplink transmission, dynamic scheduling and configured scheduling.

In the dynamic scheduling, when new data is ready for transmission and there is no uplink grant available, a User Equipment (UE) shall first transmit a scheduling request to a (next) generation NodeB (gNB) using preconfigured, periodic resources. Upon reception of the scheduling request, the gNB allocates an uplink grant to the UE via a Physical Downlink Control Channel (PDCCH). Upon reception of the UL grant, the UE prepares Media Access Control (MAC) Protocol Data Units (PDUs), encodes the MAC PDUs and maps the encoded MAC PDUs to Physical Uplink Shared Channel (PUSCH) for uplink transmission. In unlicensed bands, the gNB needs to perform a Listen Before Talk (LBT) process before transmitting the uplink grant, and the UE also needs to perform LBT processes before transmitting the scheduling request and the PUSCH. This means at least three LBT processes are required for uplink data transmission. Accordingly, there will be an increased risk of not being able to access the channel.

In the configured scheduling, or sometimes called semi-persistent scheduling, a gNB preconfigures periodic radio resources for a UE. The UE can use the radio resources when there is uplink data to be transmitted. In this way, the UE can directly transmit PUSCH using the preconfigured radio resource without transmitting a scheduling request first. The gNB does not need to transmit a specific uplink grant for each uplink transmission. In unlicensed bands, this means the LBT process at the UE for transmission of the scheduling request and the LBT process at the gNB for transmission of the uplink grant TX can be omitted.

In NR, there are two types of configured scheduling schemes for uplink, referred to as Configured Scheduling (CS) Type 1 and Type 2 respectively. For CS Type 1, all parameters, including a periodicity, a number of HARQ processes, a CS-Radio Network Temporary Identifier (CS-RNTI), power control parameters, time-frequency resources and a Modulation and Coding Scheme (MCS), are configured via Radio Resource Control (RRC) signaling. A configured grant is activated when the UE receives an RRC message to configure the CS Type 1. For CS Type 2, a two-phase configuration procedure is applied. In phase 1, a set of parameters, such as a periodicity, a number of HARQ processes, a CS-RNTI and power control parameters are signaled by the gNB via RRC signaling. In phase 2, the serving gNB can conditionally determine when to activate/reactivate the configured grant Type 2 and transmit physical layer parameters, such as time-frequency resources and an MCS, via an uplink grant addressed to the CS-RNTI.

For both CS Type 1 and CS Type 2, transmission opportunities (i.e. configured uplink grants) occur according to the configured periodicity. The UE can determine the configured grant occurrence according to the respective formulas in Section 5.8 of 3GPP TS 38.321-f10, which is incorporated here by reference in its entirety. When the UE determines to transmit data using a configured grant, it should also determine a HARQ process ID associated with the configured grant according to Section 5.4.1 of 3GPP TS 38.321-f10, which is reproduced below for reference:

Once a UE transmits data using a configured grant, the UE should also determine the HARQ process ID associated with the configured grant according to the defined formula in Section 5.4.1 in 3GPP TS 38.321-f10. The corresponding part is copied below for quick reference:

For configured uplink grants, the HARQ Process ID associated with the first symbol of a UL transmission is derived from the following equation:

HARQ Process ID=[floor(CURRENT_symbol/periodicity)]modulo nrofHARQ-Processes where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively as specified in TS 38.211.

NOTE 1: CURRENT_symbol refers to the symbol index of the first transmission occasion of a repetition bundle that takes place.

NOTE 2: A HARQ process is configured for a configured grant if the configured grant is activated and the associated HARQ process ID is less than nrofHARQ-Processes.

When a HARQ process is used for a HARQ transmission, an associated configuredGrantTimer is started with a pre-configured value. When the associated configuredGrantTimer is running, the UE should not use the same HARQ process for another transmission using any configured grant. The expiration of the associated configuredGrantTimer means: 1) the corresponding HARQ process is released; and 2) the corresponding HARQ transmission has succeeded. That is, the UE can use the same HARQ process for uplink transmission using a configured grant when the associated configuredGrantTimer expires.

In 3GPP TS 38.331-f10, the configuredGrantTimer values are listed, as follows: configuredGrantTimer ENUMERATED {sym2, sym7, sym1x14, sym2x14, sym4x14, sym5x14, sym8x14, sym10x14, sym16x14, sym20x14, sym32x14, sym40x14, sym64x14, sym80x14, sym128x14, sym160x14, sym256x14, sym512x14, sym640x14, sym6, sym1x12, sym2x12, sym4x12, sym5x12, sym8x12, sym10x12, sym16x12, sym20x12, sym32x12, sym40x12, sym64x12, sym80x12, sym128x12, sym256x12, sym320x12, sym512x12, sym640x12}, where "symx" denotes a timer value of x symbols, and "symy_x" denotes a timer value of y slots each containing x symbols.

Like Licensed Assisted Access-Long Term Evolution (LAA-LTE) or enhanced LAA-LTE (eLAA-LTE), asynchronous HARQ is used for Autonomous Uplink (AUL) transmissions in NR. In LAA-LTE or eLAA-LTE, a channel named AUL-DFI (AUL-Dynamic Feedback Indicator) is used to provide HARQ feedback for AUL-based uplink HARQ transmissions. Dynamic HARQ feedback for autonomous uplink transmission can reduce residual HARQ transmission failures due to channel unavailability or channel access collisions between neighboring transmitters. For unlicensed operations in NR, it is likely that similar dynamic HARQ feedback will be used for AUL-based uplink HARQ transmissions.

SUMMARY

It is an object of the present disclosure to provide methods and devices for facilitating HARQ transmission.

According to a first aspect of the present disclosure, a method in a terminal device for facilitating HARQ transmission. The method includes: starting, upon transmitting data to a network device in a first HARQ transmission using a first HARQ process, a first configured grant timer associated with first the HARQ process; receiving from the network device HARQ feedback information associated with the first HARQ transmission; and applying a timer operation to the first configured grant timer based on the HARQ feedback information.

In an embodiment, the operation of applying can include: stopping the first configured grant timer when the HARQ feedback information is a HARQ Acknowledgement (ACK) such that the first HARQ process is released.

In an embodiment, the operation of applying can include: restarting the first configured grant timer when the HARQ feedback information is a HARQ Non-Acknowledgement (NACK).

In an embodiment, the first HARQ transmission can contain a plurality of Code Block Groups (CBGs). The operation of applying can include: restarting the first configured grant timer when the HARQ feedback information associated with any of the CBGs is a HARQ NACK.

In an embodiment, the first configured grant timer can be set to a predetermined value when it is restarted. The predetermined value can be derived from configuration information received from the network device.

In an embodiment, the method can further include: starting, upon transmitting data to the network device in a second HARQ transmission following the first HARQ transmission using a second HARQ process, a second configured grant timer associated with second the HARQ process. The HARQ feedback information can be aggregated HARQ feedback information associated with the first and second HARQ transmissions. The first configured grant timer can be set to a first value and the second configured grant timer can be set to a second value. The first value can be larger than the second value.

In an embodiment, the first value can be larger than the second value by a time difference between the first HARQ transmission and the second HARQ transmission.

In an embodiment, the first HARQ transmission can have a first priority level. The method can further include: transmitting data in a second HARQ transmission having a second priority level higher than the first priority level using the first HARQ process, while the first configured grant timer is running; and restarting the first configured grant timer upon transmitting the data in the second HARQ transmission.

According to a second aspect of the present disclosure, a method in a terminal device for facilitating HARQ transmission is provided. The method includes: starting, upon transmitting data in a first HARQ transmission having a first priority level using a HARQ process, a configured grant timer associated with the HARQ process; transmitting data in a second HARQ transmission having a second priority level higher than the first priority level using the HARQ process, while the timer is running; and restarting the timer upon transmitting the data in the second HARQ transmission.

According to a third aspect of the present disclosure, a terminal device is provided. The terminal device includes a transceiver, a processor and a memory. The memory contains instructions executable by the processor whereby the terminal device is operative to perform the method according to any of the above first and second aspects.

According to a fourth aspect of the present disclosure, a computer readable storage medium is provided. The computer readable storage medium has computer program instructions stored thereon. The computer program instructions, when executed by a processor in a terminal device, cause the terminal device to perform the method according to any of the above first and second aspects.

According to a fifth aspect of the present disclosure, a method in a network device for facilitating HARQ transmission is provided. The method includes: transmitting configuration information to a terminal device, the configuration information indicating a value to which a configured grant timer is to be set when the configured grant timer is restarted at the terminal device in response to a HARQ Non-Acknowledgement (NACK).

In an embodiment, the value can be dependent on a traffic load at the network device.

According to a sixth aspect of the present disclosure, a network device is provided. The network device includes a transceiver, a processor and a memory. The memory contains instructions executable by the processor whereby the network device is operative to perform the method according to the above fifth aspect.

According to a seventh aspect of the present disclosure, a computer readable storage medium is provided. The computer readable storage medium has computer program instructions stored thereon. The computer program instructions, when executed by a processor in a network device, cause the network device to perform the method according to the above fifth aspect.

According to an eighth aspect of the present disclosure, a communication system is provided. The communication system includes a host computer including: processing circuitry configured to provide user data; and a communication interface configured to forward the user data to a cellular network for transmission to a user equipment (UE). The cellular network includes a base station having a radio interface and processing circuitry. The base station's processing circuitry is configured to perform the method according to the above fifth aspect.

In an embodiment, the communication system can further include the base station.

In an embodiment, the communication system can further include the UE. The UE can be configured to communicate with the base station.

In an embodiment, the processing circuitry of the host computer can be configured to execute a host application, thereby providing the user data; and the UE can include processing circuitry configured to execute a client application associated with the host application.

According to a ninth aspect of the present disclosure, a method implemented in a communication system is provided. The communication system includes a host computer, a base station and a user equipment (UE) is provided. The method includes: at the host computer, providing user data; and at the host computer, initiating a transmission carrying the user data to the UE via a cellular network including the base station. The base station performs the method according to the above fifth aspect.

In an embodiment, the method can further include: at the base station, transmitting the user data.

In an embodiment, the user data can be provided at the host computer by executing a host application. The method can further include: at the UE, executing a client application associated with the host application.

According to a tenth aspect of the present disclosure, a communication system is provided. The communication system includes a host computer including: processing circuitry configured to provide user data; and a communication interface configured to forward user data to a cellular network for transmission to a user equipment (UE). The UE includes a radio interface and processing circuitry. The UE's processing circuitry is configured to perform the method according to any of the above first and second aspects.

In an embodiment, the communication system can further include the UE.

In an embodiment, the cellular network can further include a base station configured to communicate with the UE.

In an embodiment, the processing circuitry of the host computer can be configured to execute a host application, thereby providing the user data; and the UE's processing circuitry can be configured to execute a client application associated with the host application.

According to an eleventh aspect of the present disclosure, a method implemented in a communication system is provided. The communication system includes a host computer, a base station and a user equipment (UE). The method includes: at the host computer, providing user data; and at the host computer, initiating a transmission carrying the user data to the UE via a cellular network including the base station. The UE performs the method according to any of the above first and second aspects.

In an embodiment, the method can further include: at the UE, receiving the user data from the base station.

According to a twelfth aspect of the present disclosure, a communication system is provided. The communication system includes a host computer including: a communication interface configured to receive user data originating from a transmission from a user equipment (UE) to a base station. The UE includes a radio interface and processing circuitry. The UE's processing circuitry is configured to: perform the method according to any of the above first and second aspects.

In an embodiment, the communication system can further include the UE.

In an embodiment, the communication system can further include the base station. The base station can include a radio interface configured to communicate with the UE and a communication interface configured to forward to the host computer the user data carried by a transmission from the UE to the base station.

In an embodiment, the processing circuitry of the host computer can be configured to execute a host application; and the UE's processing circuitry can be configured to execute a client application associated with the host application, thereby providing the user data.

In an embodiment, the processing circuitry of the host computer can be configured to execute a host application, thereby providing request data; and the UE's processing circuitry can be configured to execute a client application associated with the host application, thereby providing the user data in response to the request data.

According to a thirteenth aspect of the present disclosure, a method implemented in a communication system is provided. The communication system includes a host computer, a base station and a user equipment (UE). The method includes: at the host computer, receiving user data transmitted to the base station from the UE. The UE performs the method according to any of the above first and second aspects.

In an embodiment, the method can further include: at the UE, providing the user data to the base station.

In an embodiment, the method can further include: at the UE, executing a client application, thereby providing the user data to be transmitted; and at the host computer, executing a host application associated with the client application.

In an embodiment, the method can further include: at the UE, executing a client application; and at the UE, receiving input data to the client application, the input data being provided at the host computer by executing a host application associated with the client application. The user data to be transmitted can be provided by the client application in response to the input data.

According to a fourteenth aspect of the present disclosure, a communication system is provided. The communication system includes a host computer including a communication interface configured to receive user data originating from a transmission from a user equipment (UE) to a base station. The base station includes a radio interface and processing circuitry. The base station's processing circuitry is configured to perform the method according to the above fifth aspect.

In an embodiment, the communication system can further include the base station.

In an embodiment, the communication system can further include the UE. The UE can be configured to communicate with the base station.

In an embodiment, the processing circuitry of the host computer can be configured to execute a host application; the UE can be configured to execute a client application associated with the host application, thereby providing the user data to be received by the host computer.

According to a fifteenth aspect of the present disclosure, a method implemented in a communication system is provided. The communication system includes a host computer, a base station and a user equipment (UE). The method includes: at the host computer, receiving, from the base station, user data originating from a transmission which the base station has received from the UE. The base station performs the method according to the above fifth aspect.

In an embodiment, the method can further include: at the base station, receiving the user data from the UE.

In an embodiment, the method can further include: at the base station, initiating a transmission of the received user data to the host computer.

With the embodiments of the present disclosure, upon transmitting data to a network device in a HARQ transmission using a HARQ process, a terminal device can start a configured grant timer associated with the HARQ process. Then, upon receiving from the network device HARQ feedback information associated with the HARQ transmission, the terminal device can apply a timer operation to the configured grant timer based on the HARQ feedback information. For example, the terminal device can stop the configured grant timer upon receiving a HARQ ACK so as to release the HARQ process, or restart the configured grant timer upon receiving a HARQ NACK.

BRIEF DESCRIPTION OF THE DRAWINGS

The above and other objects, features and advantages will be more apparent from the following description of embodiments with reference to the figures, in which.

DETAILED DESCRIPTION

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

In NR, the AUL-based uplink HARQ transmissions are based on the configured scheduling scheme. As discussed above, for the CS Type 1 or Type 2, there is a configuredGrantTimer associated with each HARQ process using configured scheduling. If the configuredGrantTimer associated with a HARQ process is running, it indicates that this HARQ process has not been released yet and the UE should avoid using this HARQ process for uplink transmission using any configured grant.

In the 3GPP TS 38.321-f10, the configuredGrantTimer operations, including setting the timer value and starting, restarting or stopping the configuredGrantTimer, are defined assuming that there is no HARQ feedback for any uplink HARQ transmission. However, as discussed above, the dynamic HARQ feedback can be provided in unlicensed operations. In this case, it is desired to define timer operations responsive to the HARQ feedback. It is to be noted here that the present disclosure is not limited to the unlicensed operations. Rather, it is applicable to any HARQ transmission where a HARQ feedback is provided.

Figure 1:
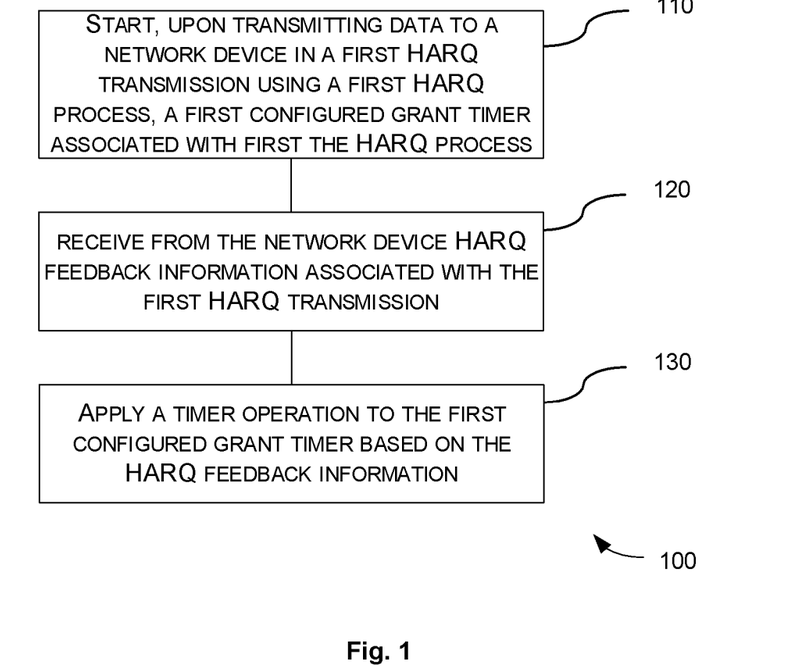
FIG. 1 is a flowchart illustrating a method in a terminal device for facilitating HARQ transmission according to an embodiment of the present disclosure.

FIG. 1 is a flowchart illustrating a method 100 for facilitating HARQ transmission according to an embodiment of the present disclosure. The method 100 can be performed at a terminal device.

At block 110, upon transmitting data to a network device in a first HARQ transmission using a first HARQ process, the terminal device starts a first configured grant timer (e.g., configuredGrantTimer as described above) associated with first the HARQ process.

At block 120, the terminal device receives from the network device HARQ feedback information associated with the first HARQ transmission. The HARQ feedback information may be a HARQ ACK or a HARQ NACK.

At block 130, the terminal device applies a timer operation to the first configured grant timer based on the HARQ feedback information.

In an example, in the block 130, the terminal device can stop the first configured grant timer when the HARQ feedback information is a HARQ ACK. In this way, as soon as the HARQ ACK is received, the first configured grant timer can be stopped and the first HARQ process can be released.

In another example, in the block 130, the terminal device can restart the first configured grant timer when the HARQ feedback information is a HARQ NACK. When the first HARQ transmission contains a plurality of Code Block Groups (CBGs), the terminal device can restart the first configured grant timer when the HARQ feedback information associated with any of the CBGs is a HARQ NACK. Here, the first configured grant timer can be restarted with its original value. Alternatively, the first configured grant timer can be set to a predetermined value when it is restarted. The predetermined value can be derived from configuration information received from the network device. Then, the terminal device can wait for a dynamic grant to schedule retransmission using the first HARQ process when the first configured grant timer is running. The restarting of the timer allows the network device to have sufficient time to schedule the retransmission when there is a risk of channel unavailability due to, e.g., LBT failure, or extra delay due to e.g., high traffic load at the network device.

Further, upon transmitting data to the network device in a second HARQ transmission following the first HARQ transmission using a second HARQ process, the terminal device can start a second configured grant timer associated with second the HARQ process. The HARQ feedback information can be aggregated HARQ feedback information associated with the first and second HARQ transmissions. The first configured grant timer can be set to a first value and the second configured grant timer can be set to a second value. The first value can be larger than the second value, e.g., by a time difference between the first HARQ transmission and the second HARQ transmission.

Figure 2:
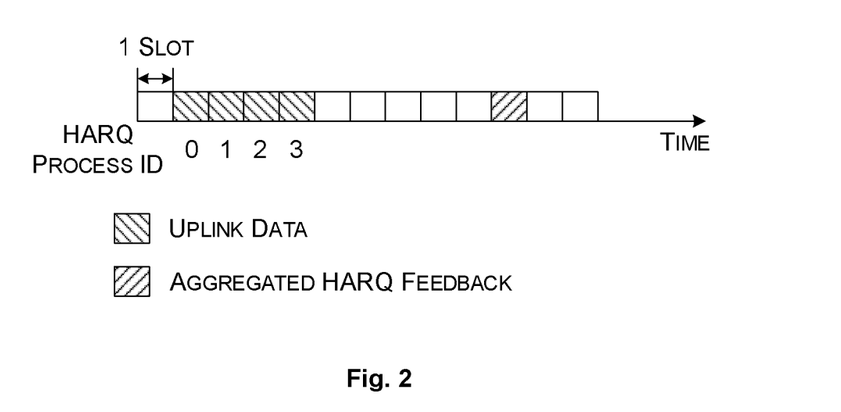
FIG. 2 is a schematic diagram showing an example of multi-slot scheduling and aggregated HARQ feedback information.

FIG. 2 is a schematic diagram showing an example of multi-slot scheduling and aggregated HARQ feedback information. As shown, in a multi-slot scheduling scenario, a terminal device transmits uplink data in four HARQ transmissions using HARQ processes 0, 1, 2 and 3, respectively, and then receives aggregated HARQ feedback information for all four HARQ transmissions. In this case, if all the HARQ processes use the same configured grant timer value, the HARQ transmission using HARQ process 0 will have a higher risk that its associated timer would expire before the aggregated HARQ feedback information can be received, than any of the other HARQ transmission. Hence, for fairness reasons, the value of the configured grant timer associated with HARQ process 0 is set to be larger than the value of the configured grant timer associated with any of HARQ processes 1, 2 and 3. Preferably, the value of the configured grant timer associated with HARQ process 0 can be set to be one slot larger than the value of the configured grant timer associated with HARQ process 1, which in turn can be set to be one slot larger than the value of the configured grant timer associated with HARQ process 2, and so on.

Moreover, assuming that the first HARQ transmission (or the data transmitted in the first HARQ transmission) has a first priority level, when new data having a second priority level higher than the first priority level is to be transmitted the terminal device can transmit the new data in a second HARQ transmission (which can also be considered to have the second priority level) using the first HARQ process even if the first configured grant timer is running. The terminal device can restart the first configured grant timer upon transmitting the new data in the second HARQ transmission.

Figure 3:
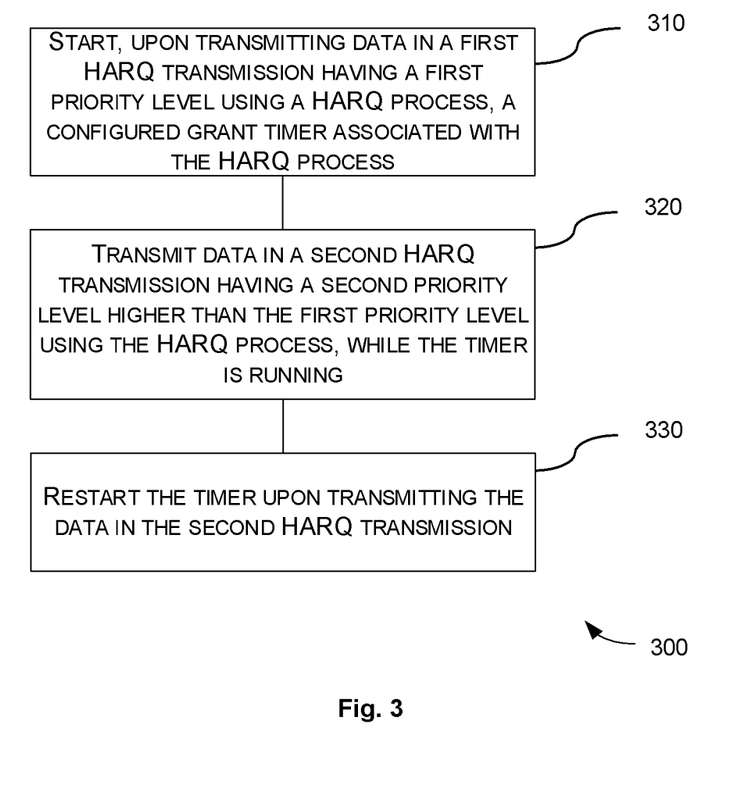
FIG. 3 is a flowchart illustrating a method in a terminal device for facilitating HARQ transmission according to another embodiment of the present disclosure.

FIG. 3 is a flowchart illustrating a method 300 for facilitating HARQ transmission according to an embodiment of the present disclosure. The method 300 can be performed at a terminal device.

At block 310, upon transmitting data in a first HARQ transmission having a first priority level using a HARQ process, the terminal device starts a configured grant timer associated with the HARQ process.

At block 320, the terminal device transmits data in a second HARQ transmission having a second priority level higher than the first priority level using the HARQ process, while the timer is running.

At block 330, the terminal device restarts the timer upon transmitting the data in the second HARQ transmission.

Figure 4:
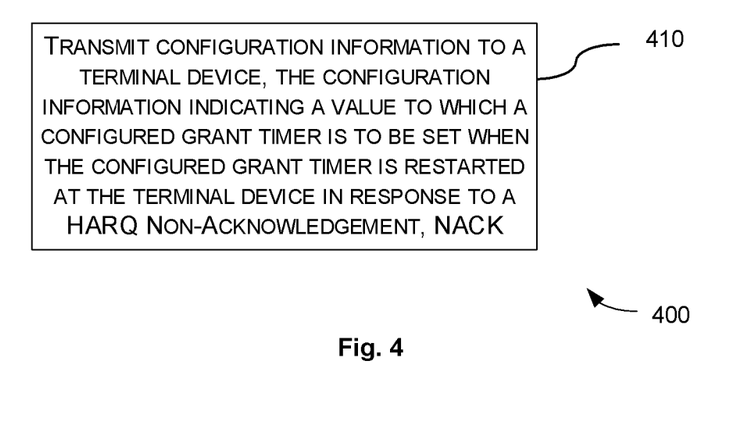
FIG. 4 is a flowchart illustrating a method in a network device for facilitating HARQ transmission according to another embodiment of the present disclosure.

FIG. 4 is a flowchart illustrating a method 400 for facilitating HARQ transmission according to another embodiment of the present disclosure. The method 400 can be performed at a network device.

At block 410, the network device transmits configuration information to a terminal device. The configuration information indicates a value to which a configured grant timer is to be set when the configured grant timer is restarted at the terminal device in response to a HARQ NACK.

In an example, the value is dependent on a traffic load at the network device. In other words, the network device can determine the value based on its traffic load. For example, the higher the traffic load is, the larger the value could be.

Figure 5:
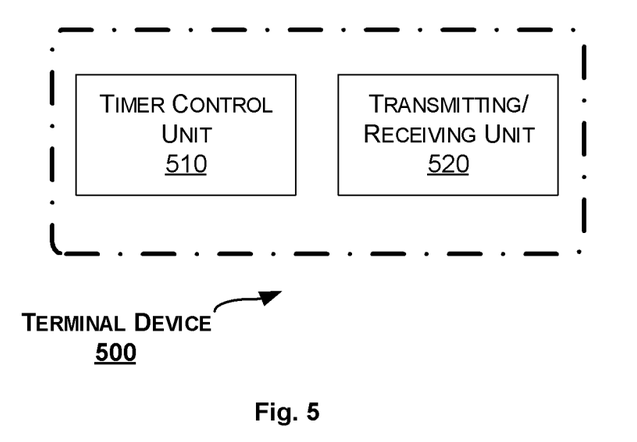
FIG. 5 is a block diagram of a terminal device according to an embodiment of the present disclosure.

Correspondingly to the method 100 and/or 300 as described above, a terminal device is provided. FIG. 5 is a block diagram of a terminal device 500 according to an embodiment of the present disclosure.

As shown in FIG. 5, the terminal device 500 includes a timer control unit 510 configured to start, upon transmitting data to a network device in a first HARQ transmission using a first HARQ process, a first configured grant timer associated with first the HARQ process. The terminal device 500 further includes a transmitting/receiving unit 520 configured to receive from the network device HARQ feedback information associated with the first HARQ transmission. The timer control unit 510 is further configured to apply a timer operation to the first configured grant timer based on the HARQ feedback information.

In an embodiment, the timer control unit 510 can be configured to stop the first configured grant timer when the HARQ feedback information is a HARQ Acknowledgement (ACK) such that the first HARQ process is released.

In an embodiment, the timer control unit 510 can be configured to restart the first configured grant timer when the HARQ feedback information is a HARQ Non-Acknowledgement (NACK).

In an embodiment, the first HARQ transmission can contain a plurality of Code Block Groups (CBGs). The timer control unit 510 can be configured to restart the first configured grant timer when the HARQ feedback information associated with any of the CBGs is a HARQ NACK.

In an embodiment, the first configured grant timer can be set to a predetermined value when it is restarted. The predetermined value can be derived from configuration information received from the network device.

In an embodiment, the timer control unit 510 can further be configured to start, upon transmitting data to the network device in a second HARQ transmission following the first HARQ transmission using a second HARQ process, a second configured grant timer associated with second the HARQ process. The HARQ feedback information can be aggregated HARQ feedback information associated with the first and second HARQ transmissions. The first configured grant timer can be set to a first value and the second configured grant timer can be set to a second value. The first value can be larger than the second value.

In an embodiment, the first value can be larger than the second value by a time difference between the first HARQ transmission and the second HARQ transmission.

In an embodiment, the first HARQ transmission can have a first priority level. The transmitting/receiving unit 520 can further be configured to transmit data in a second HARQ transmission having a second priority level higher than the first priority level using the first HARQ process, while the first configured grant timer is running. The timer control unit 510 can be configured to restart the first configured grant timer upon transmitting the data in the second HARQ transmission.

Alternatively, the timer control unit 510 can be configured to start, upon transmitting data in a first HARQ transmission having a first priority level using a HARQ process, a configured grant timer associated with the HARQ process. The transmitting/receiving unit 520 can be configured to transmit data in a second HARQ transmission having a second priority level higher than the first priority level using the HARQ process, while the timer is running. The timer control unit 510 can further be configured to restart the timer upon transmitting the data in the second HARQ transmission.

The units 510~520 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1 or 3.

Figure 6:
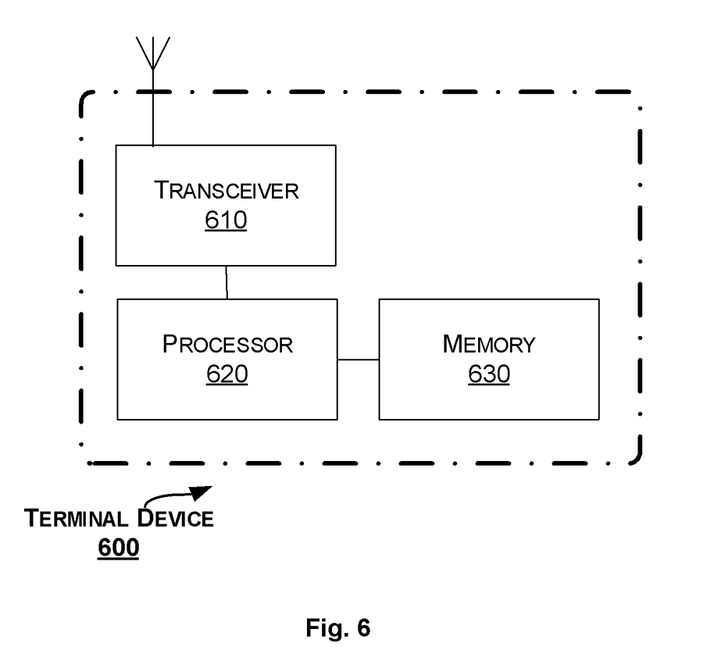
FIG. 6 is a block diagram of a terminal device according to another embodiment of the present disclosure.

FIG. 6 is a block diagram of a terminal device 600 according to another embodiment of the present disclosure.

The terminal device 600 includes a transceiver 610, a processor 620 and a memory 630. The memory 630 contains instructions executable by the processor 620 whereby the terminal device 600 is operative to perform the actions, e.g., of the procedure described earlier in conjunction with FIG. 1. Particularly, the memory 630 contains instructions executable by the processor 620 whereby the terminal device 600 is operative to: start, upon transmitting data to a network device in a first HARQ transmission using a first HARQ process, a first configured grant timer associated with first the HARQ process; receive from the network device HARQ feedback information associated with the first HARQ transmission; and apply a timer operation to the first configured grant timer based on the HARQ feedback information.

In an embodiment, the operation of applying can include: stopping the first configured grant timer when the HARQ feedback information is a HARQ Acknowledgement (ACK) such that the first HARQ process is released.

In an embodiment, the operation of applying can include: restarting the first configured grant timer when the HARQ feedback information is a HARQ Non-Acknowledgement (NACK).

In an embodiment, the first HARQ transmission can contain a plurality of Code Block Groups (CBGs). The operation of applying can include: restarting the first configured grant timer when the HARQ feedback information associated with any of the CBGs is a HARQ NACK.

In an embodiment, the first configured grant timer can be set to a predetermined value when it is restarted. The predetermined value can be derived from configuration information received from the network device.

In an embodiment, the memory 630 can further contain instructions executable by the processor 620 whereby the terminal device 600 is operative to: start, upon transmitting data to the network device in a second HARQ transmission following the first HARQ transmission using a second HARQ process, a second configured grant timer associated with second the HARQ process. The HARQ feedback information can be aggregated HARQ feedback information associated with the first and second HARQ transmissions. The first configured grant timer can be set to a first value and the second configured grant timer can be set to a second value. The first value can be larger than the second value.

In an embodiment, the first value can be larger than the second value by a time difference between the first HARQ transmission and the second HARQ transmission.

In an embodiment, the first HARQ transmission can have a first priority level. The memory 630 can further contain instructions executable by the processor 620 whereby the terminal device 600 is operative to: transmit data in a second HARQ transmission having a second priority level higher than the first priority level using the first HARQ process, while the first configured grant timer is running; and restart the first configured grant timer upon transmitting the data in the second HARQ transmission.

Alternatively, the memory 630 can contain instructions executable by the processor 620 whereby the terminal device 600 is operative to perform the actions, e.g., of the procedure described earlier in conjunction with FIG. 3. Particularly, the memory 630 contains instructions executable by the processor 620 whereby the terminal device 600 is operative to: start, upon transmitting data in a first HARQ transmission having a first priority level using a HARQ process, a configured grant timer associated with the HARQ process; transmit data in a second HARQ transmission having a second priority level higher than the first priority level using the HARQ process, while the timer is running; and restart the timer upon transmitting the data in the second HARQ transmission.

Figure 7:
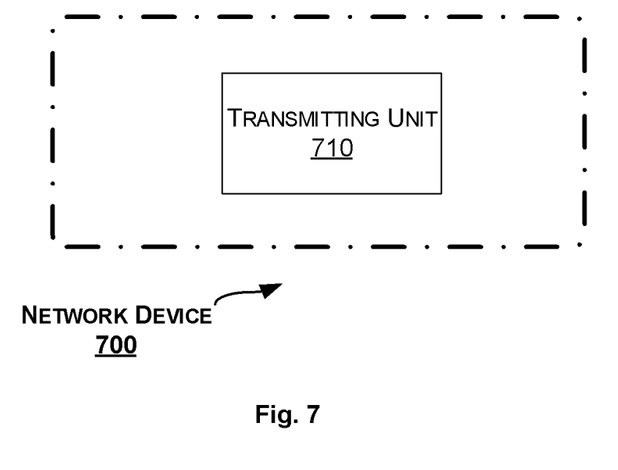
FIG. 7 is a block diagram of a network device according to an embodiment of the present disclosure.

Correspondingly to the method 400 as described above, a network device is provided. FIG. 7 is a block diagram of a network device 700 according to an embodiment of the present disclosure.

As shown in FIG. 7, the network device 700 includes a transmitting unit 710 configured to transmit configuration information to a terminal device, the configuration information indicating a value to which a configured grant timer is to be set when the configured grant timer is restarted at the terminal device in response to a HARQ Non-Acknowledgement (NACK).

In an embodiment, the value can be dependent on a traffic load at the network device.

The transmitting unit 710 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 4.

Figure 8:
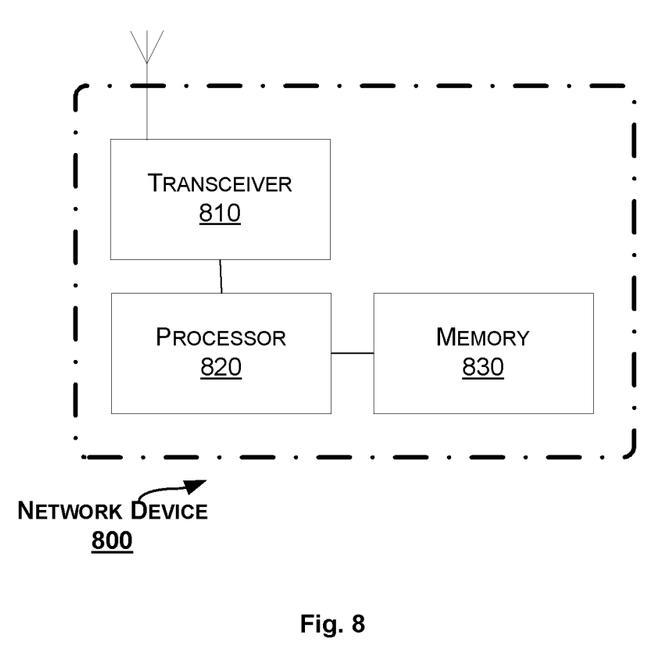
FIG. 8 is a block diagram of a network device according to another embodiment of the present disclosure.

FIG. 8 is a block diagram of a network device 800 according to another embodiment of the present disclosure.

The network device 800 includes a transceiver 810, a processor 820 and a memory 830. The memory 830 contains instructions executable by the processor 820 whereby the network device 800 is operative to perform the actions, e.g., of the procedure described earlier in conjunction with FIG. 4. Particularly, the memory 830 contains instructions executable by the processor 820 whereby the network device 800 is operative to: transmit configuration information to a terminal device, the configuration information indicating a value to which a configured grant timer is to be set when the configured grant timer is restarted at the terminal device in response to a HARQ Non-Acknowledgement (NACK).

In an embodiment, the value can be dependent on a traffic load at the network device.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 620 causes the terminal device 600 to perform the actions, e.g., of the procedure described earlier in conjunction with FIG. 1 or 3; or code/computer readable instructions, which when executed by the processor 820 causes the network device 800 to perform the actions, e.g., of the procedure described earlier in conjunction with FIG. 4.

The computer program product may be configured as a computer program code structured in computer program modules. The computer program modules could essentially perform the actions of the flow illustrated in FIG. 1, 3 or 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 9:
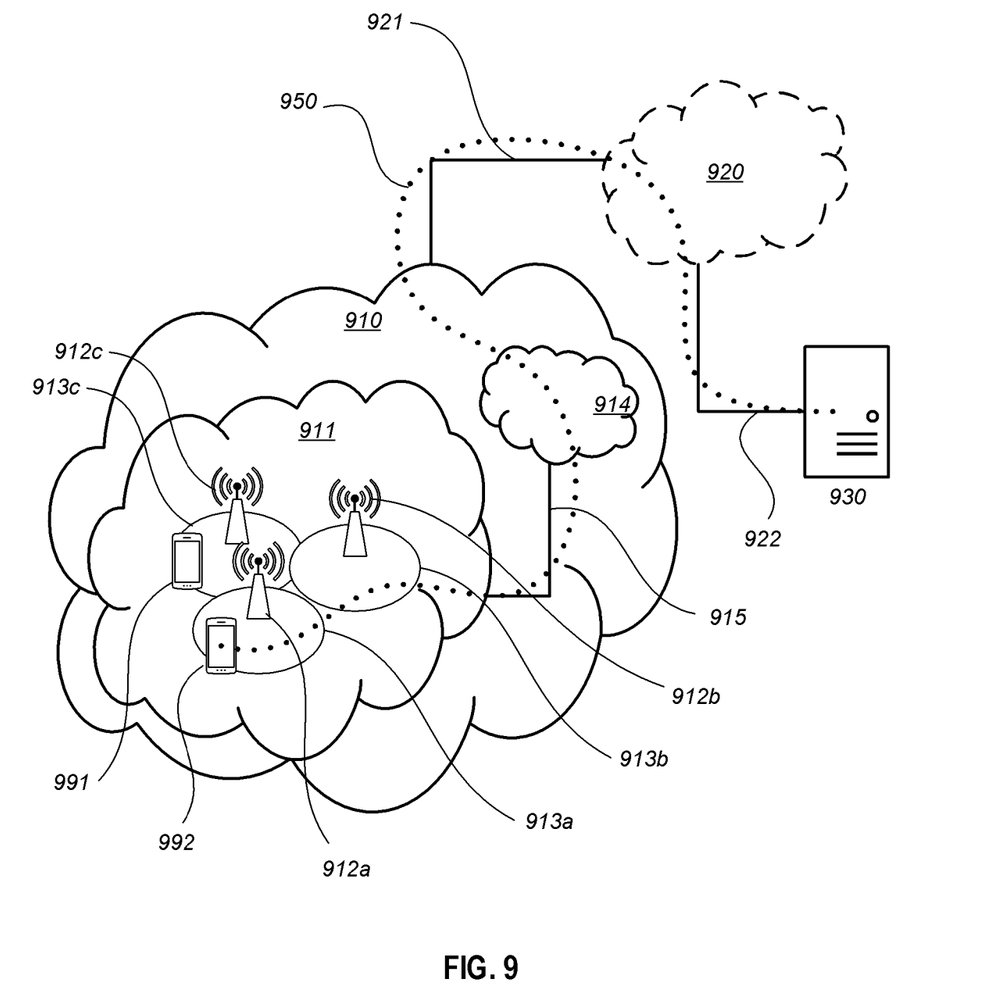
FIG. 9 schematically illustrates a telecommunication network connected via an intermediate network to a host computer.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first user equipment (UE) 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
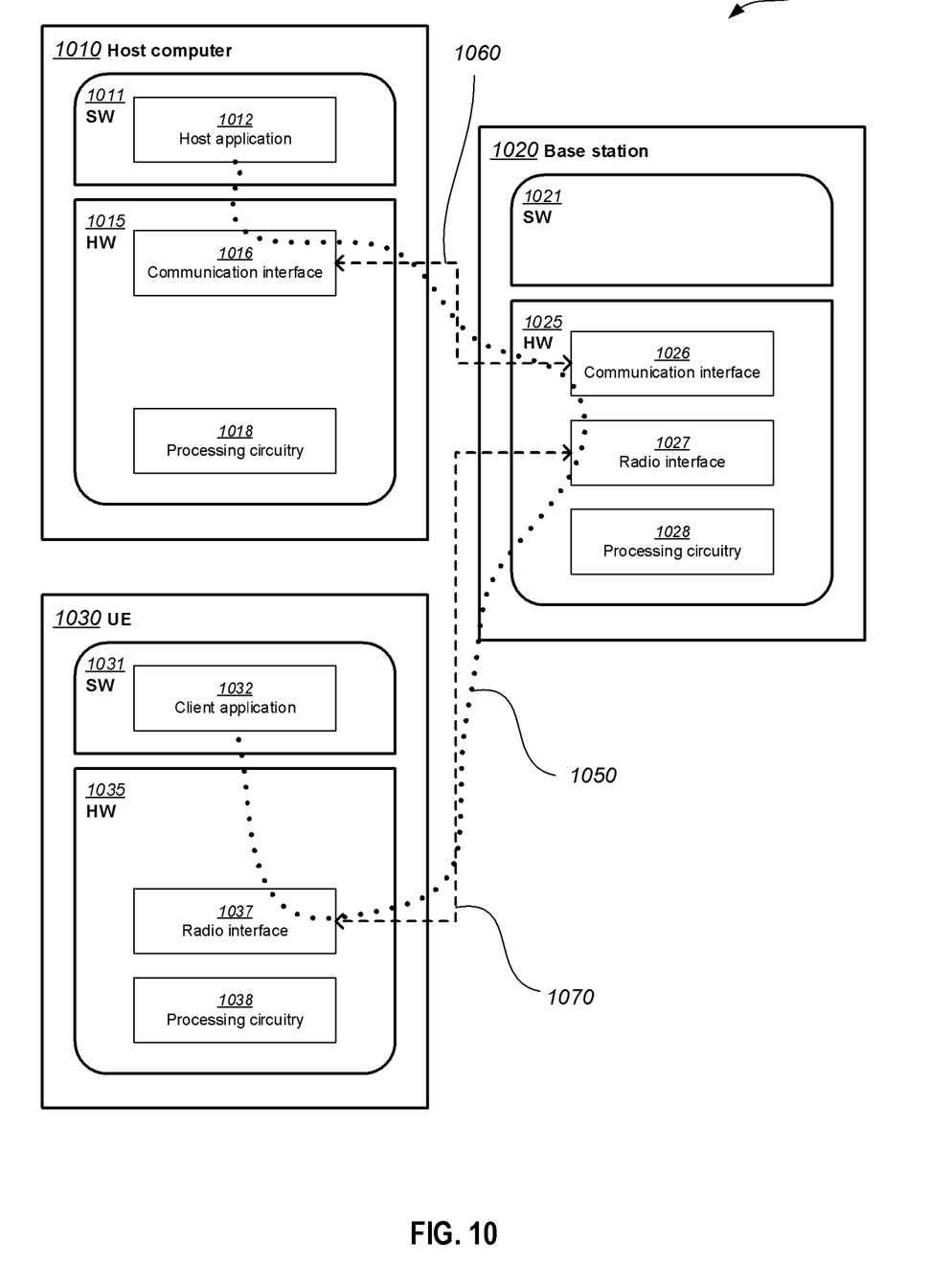
FIG. 10 is a generalized block diagram of a host computer communicating via a base station with a user equipment over a partially wireless connection.

It is noted that the host computer 1010, base station 1020 and UE 1030 illustrated in FIG. 10 may be identical to the host computer 930, one of the base stations 912a, 912b, 912c and one of the UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the radio resource utilization and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

Figure 11:
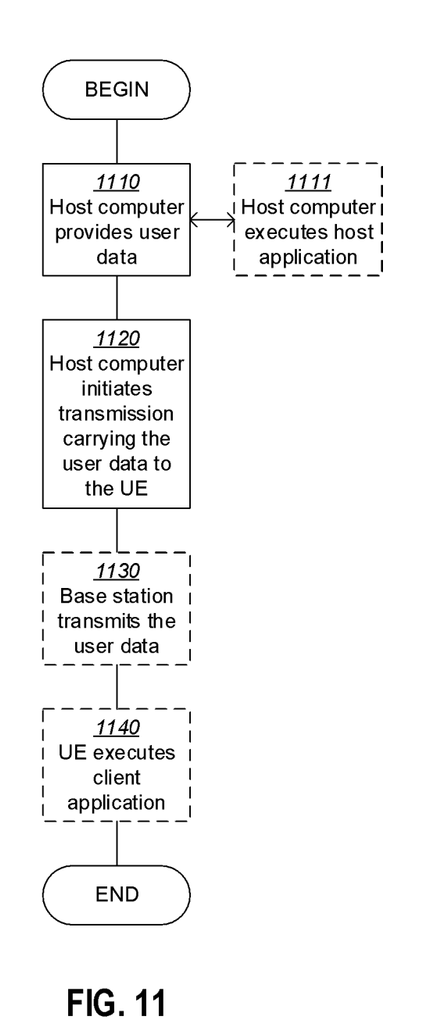
FIGS. 11 to 14 are flowcharts illustrating methods implemented in a communication system including a host computer, a base station and a user equipment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1140, the UE executes a client application associated with the host application executed by the host computer.

Figure 12:
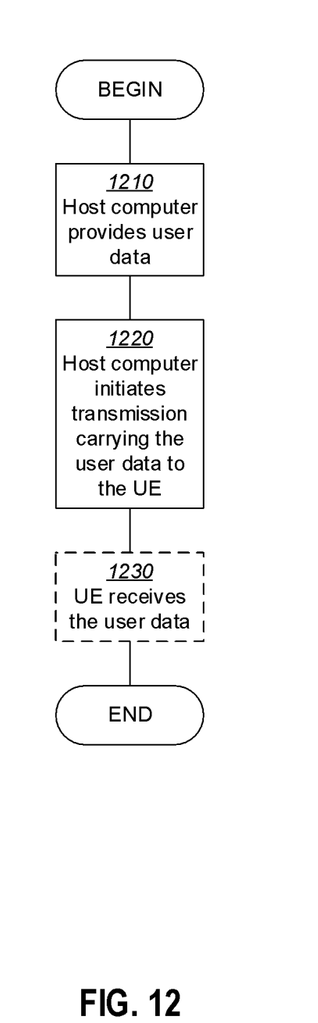

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

Figure 13:
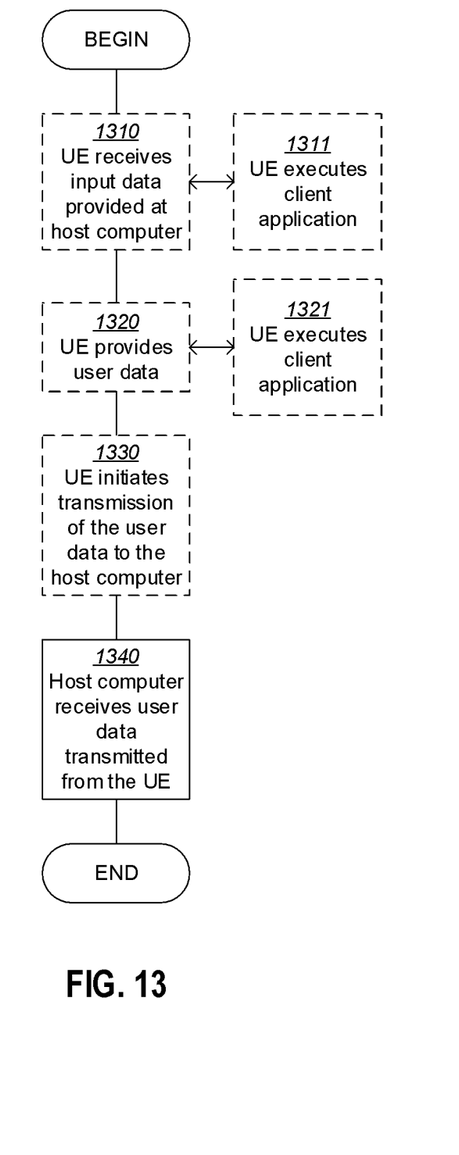

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

Figure 14:
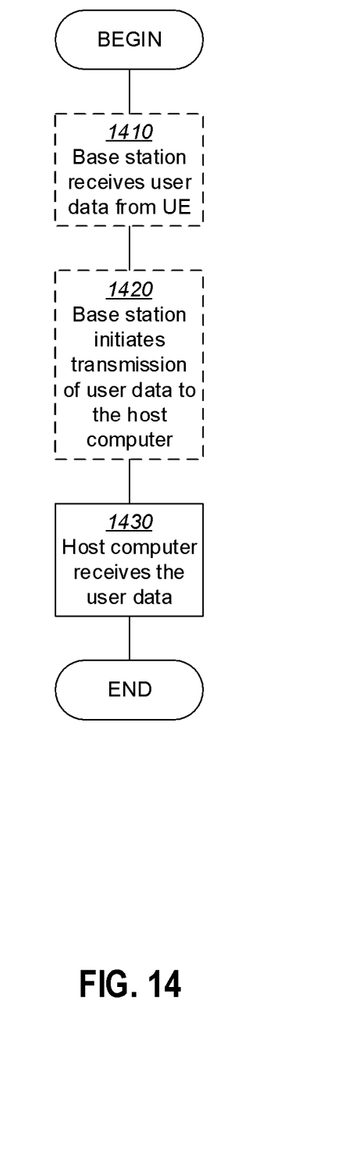

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a terminal device for facilitating Hybrid Automatic Repeat reQuest, HARQ, transmission, comprising:
   starting, upon transmitting data to a network device in a first HARQ transmission for a configured uplink grant using a first HARQ process, a first configured grant timer associated with the first HARQ process, wherein the first HARQ transmission has a first priority level:
   transmitting data in a second HARQ transmission having a second priority level higher than the first priority level using the first HARQ process while the first configured grant timer is running;
   restarting the first configured grant timer upon transmitting the data in the second HARQ transmission;
   receiving from the network device HARQ feedback information associated with the first HARQ transmission; and
   applying a timer operation to the first configured grant timer based on the HARQ feedback information.

2. The method of claim 1, wherein said applying comprises:
   stopping the first configured grant timer when the HARQ feedback information is a HARQ Acknowledgement, ACK, such that the first HARQ process is released.

3. The method of claim 1, wherein said applying comprises:
   restarting the first configured grant timer when the HARQ feedback information is a HARQ Non-Acknowledgement, NACK.

4. The method of claim 1, wherein the first HARQ transmission contains a plurality of Code Block Groups, CBGs, and said applying comprises:
   restarting the first configured grant timer when the HARQ feedback information associated with any of the CBGs is a HARQ Non-Acknowledgement, NACK.

5. The method of claim 3, wherein the first configured grant timer is set to a predetermined value when it is restarted, and wherein the predetermined value is derived from configuration information received from the network device.

6. The method of claim 1, further comprising:
   starting, upon transmitting data to the network device in a second HARQ transmission following the first HARQ transmission using a second HARQ process, a second configured grant timer associated with the second HARQ process,
   wherein the HARQ feedback information is aggregated HARQ feedback information associated with the first and second HARQ transmissions, and
   wherein the first configured grant timer is set to a first value and the second configured grant timer is set to a second value, the first value being larger than the second value.

7. The method of claim 6, wherein the first value is larger than the second value by a time difference between the first HARQ transmission and the second HARQ transmission.

8. A method in a terminal device for facilitating Hybrid Automatic Repeat reQuest, HARQ, transmission, comprising:
   starting, upon transmitting data in a configured uplink grant in a first HARQ transmission having a first priority level using a HARQ process, a configured grant timer associated with the HARQ process;
   transmitting data in the configured uplink grant in a second HARQ transmission having a second priority level higher than the first priority level using the HARQ process, while the timer is running; and
   restarting the timer upon transmitting the data in the second HARQ transmission.

9. A terminal device, comprising a transceiver, a processor and a memory, the memory comprising instructions executable by the processor whereby the terminal device is operative to perform following acts starting, upon transmitting data to a network device in a first HARQ transmission for a configured uplink grant using a first HARQ process, a first configured grant timer associated with first the HARQ process, wherein the first HARQ transmission has a first priority level:
   transmitting data in a second HARQ transmission having a second priority level higher than the first priority level using the first HARQ process while the first configured grant timer is running;
   restarting the first configured grant timer upon transmitting the data in the second HARQ transmission;
   receiving from the network device HARQ feedback information associated with the first HARQ transmission; and
   applying a timer operation to the first configured grant timer based on the HARQ feedback information.

10. The terminal device of claim 9, wherein the terminal device is operative to perform said applying in following way:
    stopping the first configured grant timer when the HARQ feedback information is a HARQ Acknowledgement, ACK, such that the first HARQ process is released.

11. The terminal device of claim 9, wherein the terminal device is operative to perform said applying in following way:
    restarting the first configured grant timer when the HARQ feedback information is a HARQ Non-Acknowledgement, NACK.

12. The terminal device of claim 9, wherein the first HARQ transmission contains a plurality of Code Block Groups, CBGs, and the terminal device is operative to perform said applying in following way:
    restarting the first configured grant timer when the HARQ feedback information associated with any of the CBGs is a HARQ Non-Acknowledgement, NACK.

13. The terminal device of claim 11, wherein the first configured grant timer is set to a predetermined value when it is restarted, and wherein the predetermined value is derived from configuration information received from the network device.

14. The terminal device of claim 9, the terminal device is operative to perform following act:
    starting, upon transmitting data to the network device in a second HARQ transmission following the first HARQ transmission using a second HARQ process, a second configured grant timer associated with second the HARQ process,
    wherein the HARQ feedback information is aggregated HARQ feedback information associated with the first and second HARQ transmissions, and
    wherein the first configured grant timer is set to a first value and the second configured grant timer is set to a second value, the first value being larger than the second value.

15. The terminal device of claim 14, wherein the first value is larger than the second value by a time difference between the first HARQ transmission and the second HARQ transmission.

* * * * *